United States Patent

Dubourg

[11] 4,255,235
[45] Mar. 10, 1981

[54] DEVICE FOR MEASURING THE FLOW RATE OF COOLING FLUID AT THE INLET OF THE CORE OF A WATER-COOLED REACTOR

[75] Inventor: Michel Dubourg, Le Mesnil St. Denis, France

[73] Assignee: Framatome, Courbevoie, France

[21] Appl. No.: 974,510

[22] Filed: Dec. 28, 1978

[30] Foreign Application Priority Data

Dec. 29, 1977 [FR] France ............... 77 39549

[51] Int. Cl.³ ............................................. G21C 17/00
[52] U.S. Cl. .................................................. 176/19 R
[58] Field of Search ............. 73/194 EM, 229, 187; 176/19 R

[56] References Cited

U.S. PATENT DOCUMENTS

| | | | |
|---|---|---|---|
| 2,583,724 | 1/1952 | Broding | 73/194 EM |
| 3,187,191 | 6/1965 | Baggs | 73/229 |
| 3,706,224 | 11/1972 | Overs | 73/187 |
| 3,724,268 | 4/1973 | Kuwabara | 176/19 J |
| 3,866,469 | 2/1975 | Wemyss | 73/229 |
| 3,922,192 | 11/1975 | Duncombe et al. | 73/194 EM |
| 3,993,539 | 11/1976 | Atherton et al. | 176/19 R |

FOREIGN PATENT DOCUMENTS

| | | | |
|---|---|---|---|
| 1183503 | 3/1970 | United Kingdom | 73/229 |
| 1270466 | 4/1972 | United Kingdom | 73/229 |
| 1302375 | 1/1973 | United Kingdom | 73/229 |

Primary Examiner—S. A. Cangialosi
Attorney, Agent, or Firm—Haseltine and Lake

[57] ABSTRACT

The invention relates to a device for measuring the flow rate of cooling fluid at the inlet of the core of a water-cooled reactor.

The device comprises a base secured to the bottom plate of the core, a vertical cylindrical casing called measuring chimney, a support structure for bearings disposed along the axis of the measuring chimney, a two-blade propeller of nonmagnetic material the shaft of which rotates in the axial bearings, one of the blades bearing a component of magnetic material, and a measuring coil supplied with direct current generating pulses to a frequency-measuring device when the magnetic component of the propeller moves in front of the coil, when the propeller is rotated by the cooling fluid travelling along the measuring chimney.

The invention is applied in particular to tests in water of pressurized water-cooled reactors.

6 Claims, 3 Drawing Figures

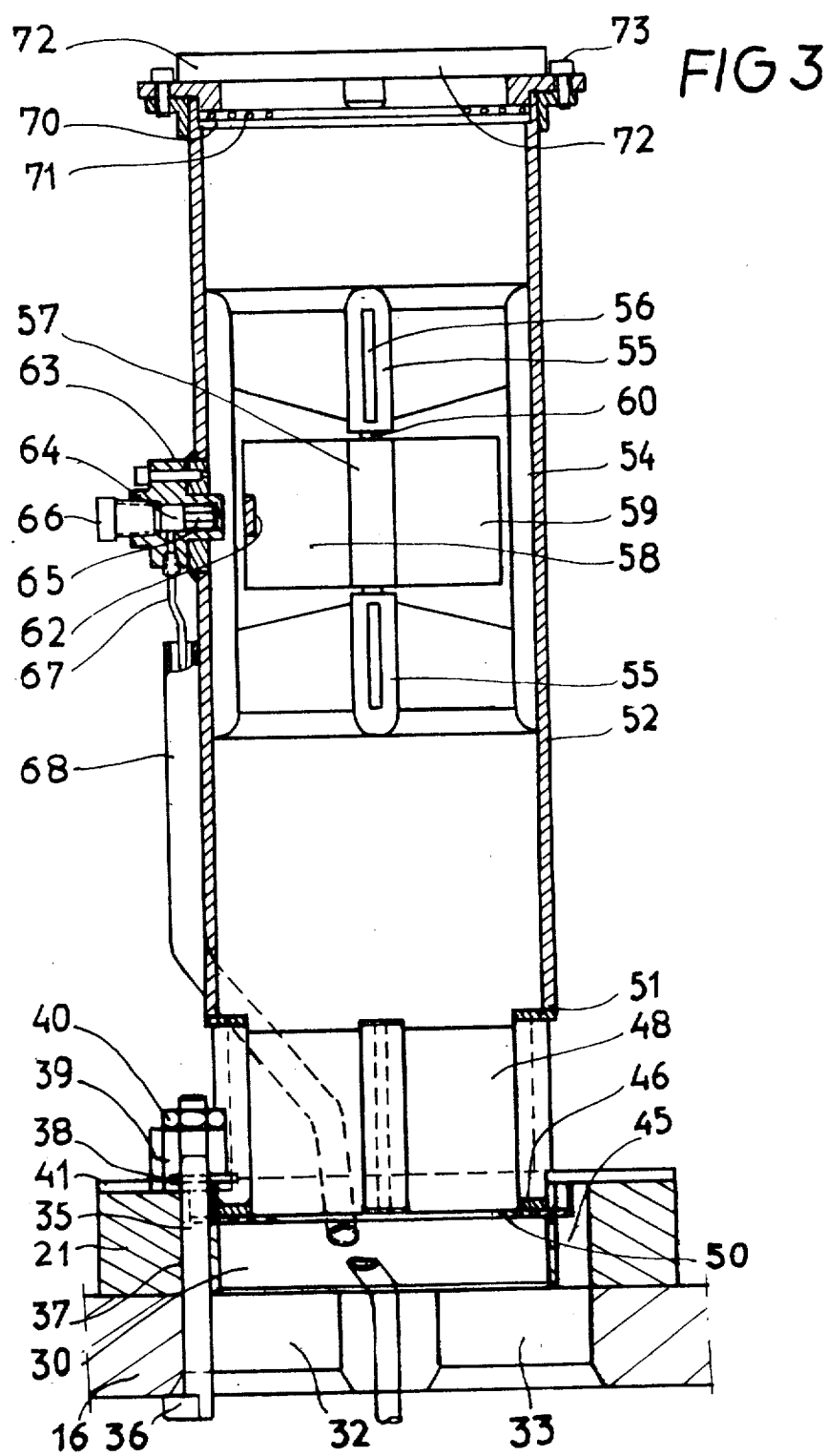

DEVICE FOR MEASURING THE FLOW RATE OF COOLING FLUID AT THE INLET OF THE CORE OF A WATER-COOLED REACTOR

The invention relates to a device for measuring the flow rate of cooling fluid at the inlet to the core of a water-cooled reactor.

During the cold and hot tests before a water-cooled nuclear reactor is put into operation, it is very useful to be able to measure the flow rate of the reactor cooling fluid, that is to say the water under pressure, at the reactor core inlet, and to make measurements for determining distribution of this flow rate at the core inlet.

These measurements are extremely useful with regard to reactor operation, since they can be used for accurately evaluating the safety margins for operating the reactor and determining whether the reactor power can be increased by increasing the flow rate of cooling fluid.

It is also very useful to know the distribution of the flow rate at the core inlet, both during the case of a normal reactor operation, for example with all the loops in operation in known reactors using water under pressure, and in asymmetrical operation using n-1 loops, in order to evaluate the safety margins corresponding to each use and find out the possibilities of asymmetrical operation in the event of a breakdown of one of the loops.

Until now there has not been any known device for measuring the flow rate of the cooling fluid at the level of the bottom plate of the reactor core which could respond to these needs.

It is in fact difficult to conceive of a measuring device which responds to the various needs desired by the users. These needs are a high accuracy and reliability of measurement, little or no variation of the information relating to the flow rate as a function of temperature variations, the water under pressure during the tests capable of being at a temperature up to the normal operating temperature (290° C.), good mechanical properties of the measuring device and the information-transmitting cables and finally little wear after prolonged use.

Water-cooled reactors comprise a pressure-resistant vertical axis cylindrical vessel closed on each of its ends by two hemispherical heads and having at least one inlet and one outlet for cooling fluid, that is to say, water under pressure which flows inside the vessel in contact with the fuel elements during part of its travel in which the cooling fluid moves vertically upwards.

Inside the vessel there is a cylindrical shroud coaxial with the vessel and suspended at its top from a bearing plate secured to the reactor vessel. Inside the cylindrical shroud, called "core shroud", fuel elements are disposed between the bottom core plate and the top core plate, each of these plates having apertures enabling the passage of the water under pressure in the core region. Accordingly, the cooling fluid enters the core region via the bottom plate. Between the reactor vessel and the cylindrical core shroud there is a space having an annular cross-section, communicating with the cooling-fluid inlet in the enclosure. The cooling-fluid outlet, on the other hand, communicates directly with the interior of the core shroud, so that the cooling fluid first flows in the space between the shroud and the vessel, then inside the core shroud between the fuel elements after entering through the apertures in the bottom core plate, then in the top part of the core shroud after flowing through the apertures in the top core plate. The cooling fluid then flows out through the outlet in the reactor vessel.

During its flow, therefore, the cooling fluid changes direction and meets various obstacles corresponding to various accessory components in the vessel, so that it is difficult to determine the flow rates and the distribution thereof at the level of the bottom core plate.

It is therefore an object of the invention to provide a device for measuring the flow rate of cooling fluid entering the core of a water-cooled nuclear reactor comprising a pressure-resistant vertical cylindrical vessel having at least one inlet and a least one outlet for cooling fluid, between which the cooling fluid flows in contact with the fuel elements forming the reactor core during part of its travel where the fluid moves vertically upwards, a top core plate and a bottom core plate formed with apertures for the circulation of the cooling fluid between which are arranged the fuel elements and a support structure provided at the top part of the vessel for securing a cylindrical shroud open at its bottom part coaxial with the vessel, arranged inside this latter and surrounding the reactor core all the way up, the vessel and the shroud forming between themselves a space of annular cross-section in communication with the inlet for the cooling fluid, whereas the cooling fluid outlet is in communication with the inner part of the shroud containing the core, this measuring device having to enable accurate and reliable measurement; to be insensitive to temperature, to be rugged and resistant in the environment of the reactor and capable of being applied to the study of the distribution of the flow rate of the cooling fluid at the level of the bottom core plate.

To this end the device according to the invention comprises:

a bearing and securing base removably secured to the bottom core plate and pierced at its central portion by an aperture in communication with at least one aperture in the bottom core plate, a vertical cylindrical casing called a "measuring chimney" secured to the base and whose internal portion communicates with the aperture of the base, a support structure secured to the interior of the measuring chimney on which are mounted two bearings disposed along the axis of the chimney, a propeller comprising two blades of non-magnetic material whose axis directed along the axis of the chimney rotates in the bearings provided on the support structure, and of which one of the blades bears an element of magnetic material, a horizontal axis measuring coil of solenoid form mounted on the envelope of the chimney at the level of the magnetic element secured to the blade, insulated from cooling fluid flowing in the chimney and supplied with direct current to produce current pulses at the moment of the passage of the element of magnetic material in front of the coil upon the rotation of the propeller under the effect of the cooling fluid in circulation in the chimney, these pulses being transmitted to a frequency-measuring device by a cable connected to the coil.

An embodiment of a measuring device according to the invention suitable for the study of the distribution of flow rates at the level of the bottom core plate of a nuclear reactor cooled by water under pressure will now be described, by way of non-limiting example.

FIG. 3 represents a measuring device according to the invention in section along a plane passing through its longitudinal axis.

Figure 1:
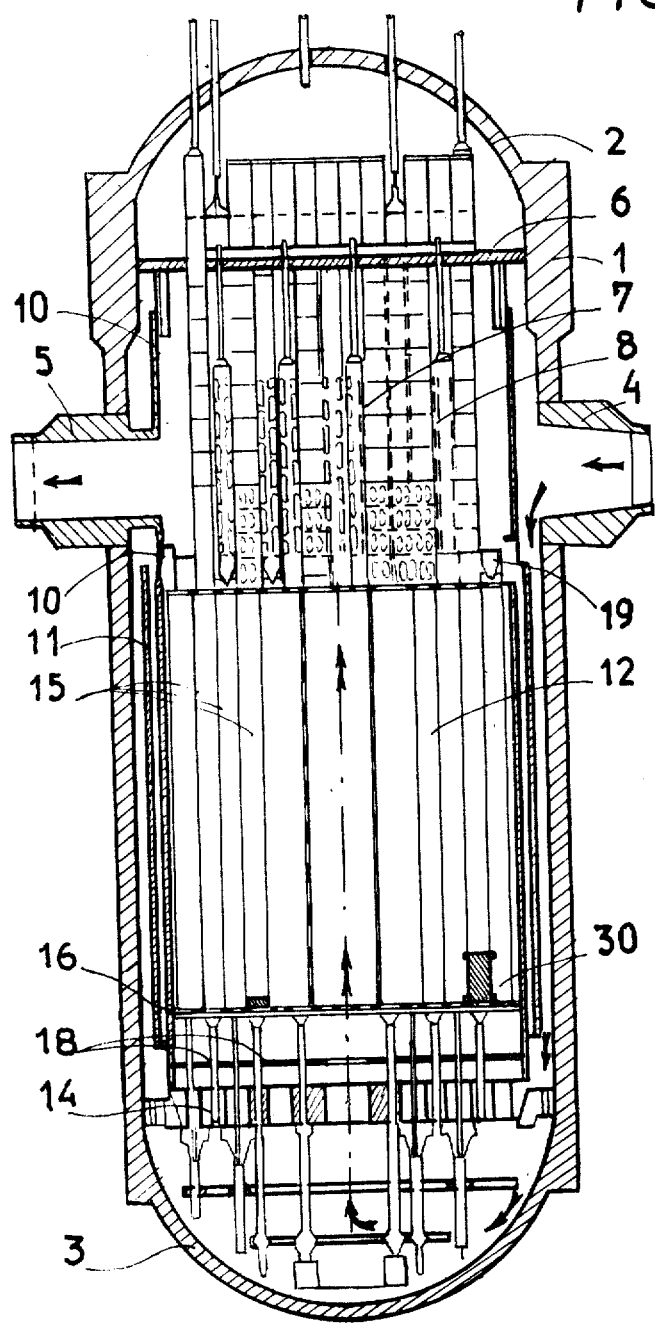
FIG. 1 represents in cross-section on a vertical plane a vessel of a nuclear reactor cooled by water under pressure whose bottom core plate may be equipped with measuring devices according to the invention.

In FIG. 1 there is seen the vessel 1 of a nuclear reactor which is cooled by water under pressure comprising a central cylindrical part and two hemispherical ends 2 and 3.

Vessel 1 has three inlets and three outlets for cooling fluid such as 4 and 5 shown in FIG. 1, these inlets and outlets for primary cooling fluid being connected in pairs via components constituting a reactor loop.

A three-loop reactor has therefore three inlets and three outlets as shown in FIG. 1.

A support plate 6 is mounted in the top part of the vessel thereby enabling the support of the guide tubes for the control bars and the spacer columns 7 and 8 and the securing of a cylindrical shroud 10 or core shroud.

This cylindrical core shroud 10 is mounted coaxially with vessel 1 and surrounds the core region 12 over its full extent.

In the core region this cylindrical shroud is itself surrounded by a thermal shield 11.

At its bottom part, the vessel is connected to a core support plate 14 enabling the support of the fuel elements 15 disposed on the bottom core plate 16 by the core support columns 18.

The fuel elements are arranged between the bottom core plate 16 and the top core plate 19 which constitutes the bottom and top ends of the core region 12.

Plates 16 and 19 have apertures enabling the passage of the primary fluid through the core.

FIG. 1 also diagrammatically shows a device 20 according to the invention for measuring flow rate, in the operating position of the bottom core plate 16.

The inet duct for primary cooling fluid, that is to say water under pressure, is in direct communication with the space arranged between the vessel 1 and the cylindrical core shroud 10 whereas the outlet duct 5 for this primary fluid is in communication with the interior of the cylindrical shroud 11, in its portion arranged above the core 12.

The primary fluid therefore travels vertically downwards through the annular space comprised between the reactor vessel and the core shroud, then rises inside this shroud through the core, through which it travels vertically upwards passing through apertures in the bottom core plate 16, gaps between the fuel elements and apertures in the top plate 19 before exiting through the fluid outlet 5 communicating with the interior of the shroud 10.

Figure 2:
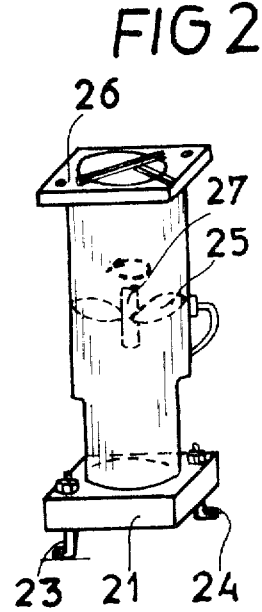
FIG. 2 is a perspective representation of a measuring device according to the invention.

In FIG. 2, there is seen in perspective view the element 20 shown in its operating position on plate 16 in FIG. 1.

This element comprises a base 21 having means 23, 24 for securing it to the bottom core plate, a cylindrical casing 25 secured to base 21 and a top diaphragm 26 connected to the top part of the cylindrical casing 25 called measuring chimney.

A measuring device 27 is secured inside the measuring chimney 25 and will be described in greater detail with reference to FIG. 3.

FIG. 3 shows the measuring device 20 secured via base 21 to the bottom core plate 16 in the vertical position as shown in FIG. 1.

Base 21 has a central circular aperture 30 which, when measuring device 20 is mounted on plate 16, coincides with apertures such as 32 and 33 traversing this core plate 16.

In reality the base 21, which has a square cross-section whose size corresponds to the cross-section of a fuel element, comprises a central aperture 30 enabling the covering of four apertures arranged in the base plate 16, these apertures enabling the passage of the cooling fluid at the level of a fuel element.

In the high-temperature and low-temperature tests during which the flow rates are measured, devices 20 are accordingly mounted on the bottom core plate instead of the fuel elements.

In order to secure them, there is introduced in the apertures such as 32 and 33 of the plate 16, rods such as 35 at the bottom portion of which a bearing block 36 had been welded. These rods extend into apertures 37 traversing the base 21, and when the block is in position, bearing against the edge of aperture 32 as shown in FIG. 2, a pin 38 extending through rod 35 is placed in a slot extending all the way up a securing element 39 disposed on the top surface of base 21 in a groove 41 for securing it in rotation.

Thereupon rod 35 is secured in rotation and the measuring device can be finally secured by tightening the nut 40 on the top threaded end of rod 35.

Usually, each measuring device is secured by two rods such as 35 provided with bearing blocks 36 extending through base 21 near two of its angles diagonally arranged.

The other two angles of the base are usually pierced with apertures such as 45 for engaging studs secured to plate 16 and intended for centering fuel elements.

A ring 46 is welded to the inner surface of aperture 30 of base 21, this ring 46 enabling the welding of the base 48 of the measuring chimney constituted by a cylindrical component having a very rigid cross-shaped section dividing the interior space of the measuring chimney into four compartments of which the transverse surface is identical.

Inside aperture 30 there is also arranged filter grid 50 for retaining any debris suspended in the primary fluid and to modify the pressure drop caused by the measuring device. A ring 51 is welded to base 48 of the measuring chimney, this ring 51 itself enabling the securing of the top part 52 of the measuring chimney which is constituted by a simple cylindrical casing coaxial with aperture 30 of the support and base 48 of the measuring chimney.

In the top cylindrical part 52 of the measuring chimney, is arranged a holder 54 secured against the cylindrical chimney wall and comprising two hollow cylindrical parts 55 disposed axially in the measuring chimney each secured to the rest of the holder by cross-shaped components 56 having 4 radial parts.

In the hollow cylinders 55 of axial direction are arranged metal carbide detachable bearings having a frustoconic bore.

A propeller 57 having two blades 58 and 59 and a shaft 60 having at each of its ends a conical tip constituted by a removable pellet of tungsten carbide, rotates in the frustoconical bearings disposed in the cylindrical holders 55.

The propeller is constituted by two parts of titanium alloy, the ends of shaft 60 being constituted by detachable conical tungsten carbide pellets.

On one of the propeller blades 58 is arranged a small magnetic component 62 to the central part and on the edge of this blade.

The other components of the flow-rate measuring device are made of non-magnetic stainless steel.

At the level of the magnetic pellet 62, a support devce 63 is screwed to a ring welded to the cylindrical casing of the measuring chimney. The support 63 extends into the measuring chimney so that the end of the cavity 64 formed in this support 63 is adjacent the region in which the magnetic component 62 moves. There is disposed in this end of the cavity 64 a coil 65 comprising a horizontally axial winding. The cavity 64 is closed by a plug 66. Accordingly, coil 65 is disposed near the magnetic element 62 but is completely insulated from the primary fluid travelling through the reactor core.

The support 63 also receives a cable 67 for supply of direct current to the coil 65 and for transmission of pulses resulting from this coil. This cable 67 extends in sealing-tight manner into the cavity 64 and is protected on its travel along the length of the measuring chimney by a stainless steel tube 68.

The cable 67 is used both for supplying and receiving the electric pulses resulting from the motion of the magnetic component 62 in front of the coil 65 when the propeller 57 is rotated by the primary fluid travelling through the apertures 32 and 33, the aperture 30 of the base 21 and the measuring chimney.

Since the speed of rotation of this propeller is proportional to the rate of flow of fluid passing through the chimney, the frequency of the current pulses produced at the level of the coil 65 can be used to measure the flow rate of fluid passing through the measuring device.

The measuring cable 67 is therefore connected both to a device for energizing the coil and to a device for counting pulses.

A diaphragm 70 is disposed at the top of the measuring chimney in order to regulate the pressure drop across the measuring device, a filter grid 71 analogous to the grid 50 and a securing stirrup 72 which can be tightened by screws 73 in order to hold the grid and the pressure drop regulating diaphragm in position.

The aforementioned device can be used to receive the flow of primary fluid passing through a set of four apertures in the plate 16, this fluid then flowing through base 21 via aperture 30, then through the four regions of the cross-shaped device 48 and into the interior of chimney 52, before reaching the region containing the measuring propeller 57.

In the region 48 and in the first part of the region 52, the primary fluid is guided, thus calming and straightening the flow lines.

The total pressure drop across the device can be adjusted by the diaphragm 70, which can easily be dismantled by means of the stirrup 72.

The total pressure drop across the device is comparable with that of filter devices sometimes used during cold and hot tests on nuclear reactors before assembling fuel elements, in order to eliminate and recover any residual debris originating from the manufacture of the reactor vessel after the reactor has first been used when cooled with water.

Of course, in order to determine the distribution of flow rates along the bottom core plate, a set of measuring devices as described are mounted at various places on the aforementioned lower core plate.

Since the pressure drops are substantially identical with those of filter devices which can be secured to the core plate in the same manner as the measuring devices, these flow-rate measuring devices can be fitted into a matrix constituted by these filter elements called "filter pavements".

It is thus that in the case of a nuclear reactor cooled by water under pressure and having three cooling loops, 15 to 30 measuring devices were appropriately distributed among the 157 available positions on the bottom core plate in order to study the distribution of flow rates.

A measuring device of the aforementioned kind can be combined with a filter device inserted between the diaphragm 70 and the grid 71 at the top part of the measuring device.

In such cases, the measuring device serves the same purpose as the filter devices which are sometimes disposed on the bottom core plate during tests before starting up the reactor.

The measuring cable 67 is insulated with alumina and leaves the reactor vessel via liquid-tight sealing bushes formed at the end of the vessel of the nuclear reactor instrumentation.

The frequency of the pulses measured in the current travelling through the coil windings can be used to measure the flow rate, which is proportional thereto.

The device according to the invention made it possible to obtain a good measurement having an accuracy of the order of 1 to 2%, a very good reliability of these measurements and only a very small drift in the measurements as a function of the water temperature, which can vary from ambient temperature to 290° C. during tests. The device also had good general mechanical properties during tests.

The moving and friction parts also showed little wear during long-term tests; more particularly the tungsten carbide tips and bearings of the measuring propeller showed very little wear.

The device according to the invention also has the advantage of enabling an adjustment of the pressure drop by inserting a diaphragm, so that the pressure drop can be adjusted to that of standard filter pavements used during certain tests. This enables, more particularly to use conventional filter pavements together with devices as described above for measuring flow rate. The adjustments enable to obtain a uniform distribution of primary fluid flow cross-sections at the bottom core plate.

On the other hand since the device can be easily dismantled, it can be transferred to a test loop for recalibrating the flow-rate measurement between two measurement operations on a nuclear reactor.

However, the invention is not intended to be limited to the aforementioned embodiment; it includes on the contrary all variants and can be modified in detail without thereby departing from its scope.

It is thus that there can be foreseen a means for securing the base of the device to the bottom core plate different from that which has been described, and filters associated with the flow-rate measuring device according to the invention can be used to eliminate various particles or debris entrained by the cooling fluid.

During cold and hot tests on the reactor before putting it into service, and before the fuel assemblies are placed in position, the flow-rate measuring devices according to the invention can be used either alone or in association with filter pavements, the pressure drop in the flow-rate measuring devices being adjusted so as to be identical to the pressure drop in known prior-art filter pavements.

Finally, the invention is applicable to any kind of water-cooled reactor and more particularly to reactors cooled by water under pressure, irrespective of the number of reactor loops and the construction of the reactor.

I claim:

1. A removable device for measuring the flow rate of cooling fluid entering the core of a water-cooled nuclear reactor during tests before putting the reactor into operation, said reactor comprising a pressure-resistant vertical cylindrical vessel having at least one inlet and at least one outlet for cooling fluid and between which the cooling fluid flows in contact with fuel elements forming the reactor core during part of its travel where the fluid moves vertically upwards, a top core plate and a bottom core plate formed with apertures for the flow of said cooling fluid, the fuel elements and a bearing structure being disposed between said core plates and the bearing structure being disposed at the top part of the vessel for securing a cylindrical shroud open at its lower part coaxial with the vessel, disposed inside the vessel and surrounding the full extent of the reactor core, the vessel and the shroud being separated by a space having an annular cross-section and connected to the inlet for the cooling fluid, the cooling fluid outlet communicating with the inner part of the shroud containing the core, said removable device comprising a bearing and securing base adapted to be removably secured to the bottom core plate so as to replace a fuel element, the core being empty of fuel elements during the tests and defining a central aperture for communicating with at least one aperture in the bottom core plate, a vertical cylindrical casing called a measuring chimney secured at its lower end to said base and comprising a diaphragm at its upper end for adjusting the pressure drop in the device, the inner portion of which communicates with the aperture in the base, a bearing structure secured to the interior of said measuring chimney, two bearings disposed along the axis of said chimney and mounted on said bearing structure, a propeller comprising two blades of non-magnetic material and coaxial with the chimney and rotatable in said bearings mounted on said bearing structure, an element made of magnetic material provided on one of said propeller blades, a horizontal axis measuring coil mounted on said chimney at the level of said magnetic element secured to said one propeller blade, said coil being insulated from cooling fluid flowing in said chimney and being connected so as to be supplied with direct current to produce current pulses at the moment when said magnetic element moves in front of said coil when said propeller is rotated by cooling fluid flowing in said chimney, and a frequency-measuring device connected by a cable to said coil.

2. A device according to claim 1, wherein the base of the measuring chimney comprises a cylindrical component having a rigid cross-shaped section for calming and straightening the flow lines in the measuring chimney.

3. A device according to claim 1 or claim 2, comprising a filter placed in the path of fluid flowing through said device in order to remove any debris entrained by the cooling fluid.

4. A device according to claim 1 wherein said measuring chimney is made of non-magnetic stainless steel and said propeller is made of titanium alloy.

5. A device according to claim 1 wherein the ends of the shaft of said propeller comprise detachable conical tips of tungsten carbide and said propeller shaft rotates in bearings made of detachable frusto-conical portions of tungsten carbide.

6. Apparatus for measuring the flow rate of cooling fluid at the inlet to a nuclear reactor core and for determining the distribution of the flow rate at the bottom plate of the core, comprising a plurality of devices according to claim 1 disposed in place of fuel elements on the bottom plate of the core and mounted in a network of filter devices secured to the bottom plate.

* * * * *